M. MAURER.
RAILROAD TRACK SCALE.
APPLICATION FILED AUG. 20, 1913.
1,149,382.
Patented Aug. 10, 1915.
2 SHEETS—SHEET 2.
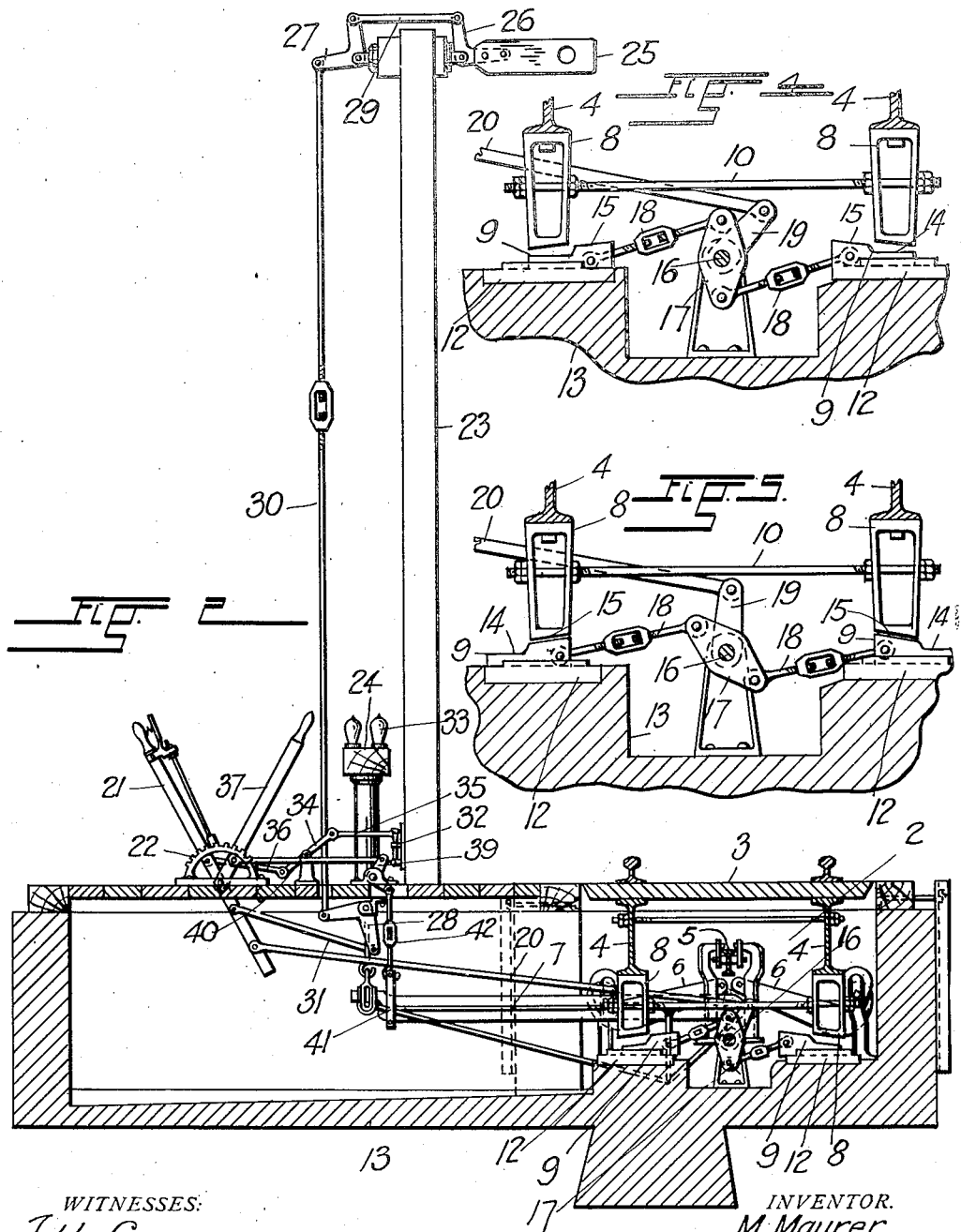
WITNESSES:
F. H. Cyons
L. Rhoades
INVENTOR.
M. Maurer.
BY
ATTORNEY.

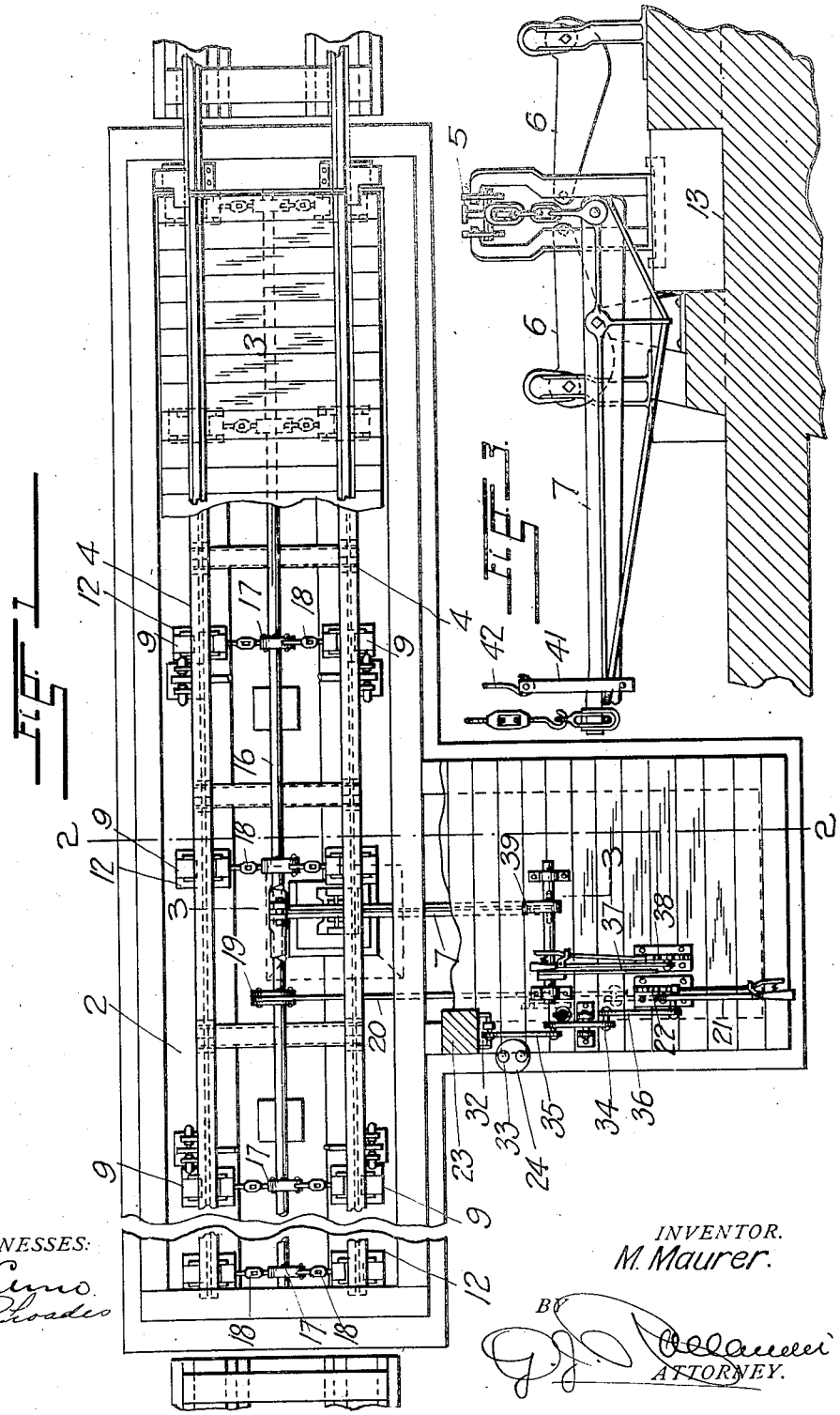

UNITED STATES PATENT OFFICE.

MARTIN MAURER, OF PUEBLO, COLORADO.

RAILROAD TRACK-SCALE.

1,149,382. Specification of Letters Patent. Patented Aug. 10, 1915.

Application filed August 20, 1913. Serial No. 785,722.

*To all whom it may concern:*

Be it known that I, MARTIN MAURER, a citizen of the United States, residing at Pueblo, in the county of Pueblo and State of Colorado, have invented certain new and useful Improvements in Railroad Track-Scales, of which the following is a specification.

This invention relates to improvements in railroad track scales and its principal object resides in the provision of a simple blocking system whereby the scale platform may be supported so that trains can pass over it without transmitting pressure to the lever system and the scale beams which are operatively connected therewith.

In proceeding in accordance with my invention I provide a series of sliding blocks which are connected to be moved simultaneously beneath the platform for the abovementioned purpose, by the operation of a single lever, and the said blocks are constructed so that when they are adjusted to the position in which the platform is free to move downwardly in the weighing operation, they provide stops upon which the platform is received in the event of an accidental excessive downward movement thereof by breakage of the mechanism with which it is connected, or other causes.

In association with the above described blocking system, I provide a lever which by its operative connection with the so-called fifth lever of the lever system of the scale, can be used to lift the platform a little from the position it normally occupies, for the purpose of facilitating the adjustment of the blocks, and I furthermore provide a semaphore and an electric lamp signal which are operated in conjunction with the blocking system to indicate by night as well as by day the condition of the scale to engineers of approaching trains, to warn them against running upon the platform when the scale is in a condition ready for weighing.

An embodiment of my invention is illustrated in the accompanying drawings in the various views of which like parts are similarly designated, and in which—

Figure 1, represents a plan view of a scale to which my improved blocking system is applied, part of the platform and pit-covering having been omitted to show subjacent parts of the mechanism, Fig. 2, a transverse section taken along the line 2—2, Fig. 1, Fig. 3, a section taken along the line 3—3, Fig. 1, and drawn to a larger scale to more clearly show the connections of the fifth lever of the lever system of the scale, and, Figs. 4—5, fragmentary, transverse sections drawn to an enlarged scale to more clearly show the construction of the blocks and the therewith connected parts of the operating mechanism in both their normal and adjusted positions.

Referring more specifically to the drawings, the reference character 2 designates the scale pit, 3 the platform which as usual is composed of a flooring laid on a pair of parallel, longitudinally disposed I-beams 4. Only such parts of the scale mechanism have been shown as are necessary to clearly describe the construction, arrangement and operation of the present invention, the numeral 5 designating the main support, 6 the extension support, and 7 the fifth lever through which connection is made with the scale beam in the usual manner.

My improved blocking system includes a number of shoes 8 which are connected in pairs at the bottom of the two I-beams 4 by means of bolts or rivets. The shoes are preferably made of hollow, slightly tapering castings the soles of which extend slant in accordance with the slanting upper surfaces of the blocks 9 which will hereinafter be described.

The shoes comprised in each pair are disposed oppositely on the two beams and are connected by means of tie-bolts 10. Metal block-supports 12 are mounted upon the scale foundation 13 underneath the shoes on the platform and are provided with slideways in which the blocks 9 are movably fitted. The upper surfaces of the blocks are stepped to provide two faces 14 and 15 of different elevations which are slanted outwardly to conform with the lower surfaces of the shoes beneath which the blocks are applied. A shaft 16 rotatably mounted in bearings on the scale foundation, extends longitudinally through the pit at equal distances from its sides, and it comprises at points intermedate of the blocks comprised in the several pairs, double crank arms 17, the extremities of which are operatively connected with the respective blocks by means of longitudinally extensible pitmen 18. The shaft 16 is furthermore provided with a crank-arm 19 which by means of a rod 20 is connected with the lower arm of an operating lever 21 which is mounted on a segment 22 outside the pit for the simultaneous adjustment of the several blocks comprised in the system.

The reference character 23 designates a semaphore of conventional construction, and 24 an electric-lamp-stand which are both erected in suitable proximity to the platform. The pivoted blade 25 of the semaphore is by means of bell-cranks 26, 27 and 28, and connecting rods 29, 30 and 31 connected with the lower arm of the lever 21 which extends into the lateral branch of the scale pit in which the fifth lever 7 has its movement.

An electric switch 32 which for convenience may be secured at the foot of the semaphore pole, is connected in the circuit of the lamps 33 which are mounted on the stand 24, and its pivoted arm is connected with the lever 21 by means of an oscillating double-crank 34 and a pair of rods 35 and 36 which extend oppositely therefrom.

The mechanism for lifting the platform to facilitate the adjustment of the blocks, comprises an operating lever 37 which may be mounted to move about an axis alined with that of the lever 21 on a segment 38 disposed adjacent to that which secures the first-mentioned lever in its adjusted position. A bell-crank 39 is mounted in bearings on the surface of the pit floor and it is connected at the end of one of its arms with the lever 37 by means of a rod 40 while a slide 41 which loosely embraces the end of the fifth lever is suspended from the other arm of the bell-crank by means of a longitudinally extensible rod 42.

When the parts comprised in the several elements of my invention are in their normal position and the platform is free to move downwardly when the scale is in use for weighing a load disposed on the platform, the blocks 9 are in the position illustrated in Figs. 2 and 4, in which the lower faces 14 of their stepped, upper surfaces, extend underneath the corresponding shoes on the platform in spaced relation to their slanting soles to permit of a limited downward movement of the platform by the weight of a superimposed load. In case the platform should fall by breakage of the parts on which it is supported, or if a weight beyond the capacity of the scale is placed thereon, the blocks will by receiving the impact of the downwardly moving mass, prevent possible damage to the scale foundation and the operative parts of the scale mechanism.

When the scale is in readiness for the weighing operation the semaphore blade is in its danger indicating position as shown in Fig. 2, to warn engineers of approaching trains against running over the scale platform, and at night the lamps on the stand 24 are lighted for the same purpose by the closed condition of the switch 32. To place the scale in a condition for the passage of cars in ordinary traffic, by blocking its platform against downward movement, the latter is first of all lifted a little off its bearings by raising the outer end of the fifth lever through the instrumentality of the operating lever 37. The blocks are subsequently moved simultaneously outwardly by manipulation of the lever 21 until their upper faces 15 are directly beneath the corresponding soles of the respective shoes, after which the platform is again released to permit the engagement of the said shoes and blocks for the purpose of supporting it against downward motion. The adjustment of the operating lever 21 caused the blade of the semaphore to move to the "safe" position and the electric switch was at the same time opened to extinguish the lamps 33. To place the scale again in a condition for weighing cars moved onto its platform, the above described operation is repeated, i. e. the platform is again lifted by the use of the lever 37, and the blocks are returned to their normal position by reversing the position of the lever 21 which at the same time moves the semaphore-blade to the danger position and closes the electric switch. The blocks may be arranged to support the platform without any load, or they may be formed so that when they are in the blocking position, a slight space remains between their upper faces 15 and the soles of the shoes to allow for a limited downward movement of the platform when cars run over the same, the purpose of this arrangement being to provide a slight play which relieves the scale parts of the detrimental effects of dead shocks.

I desire it understood that while I have shown and described my improved mechanism in the best and simplest form at present known to me, modifications in the construction and arrangement of its parts may be resorted to within the spirit of my invention; that mechanical means other than those shown may be used for the adjustment of the blocks; that said means may, if so desired, be operated by power instead of by hand, and that the blocking system may be used separate from either the mechanism for lifting the platform or the danger-indicating signals.

Having thus described my invention what I claim and desire to secure by Letters-Patent is:

1. In a railroad track scale, the combination with the movable platform and the beams included therein, of fixed supports beneath the platform, blocks slidably mounted on said supports, said blocks having faces normally disposed beneath corresponding faces on the beams in spaced relation thereto, and faces of higher elevation capable of engaging the said faces of the beams to prevent operative downward movement of the platform, and mechanism for effecting a simultaneous movement of said blocks to a position in which their said higher faces are in engagement with the said beam faces.

2. In a railroad track scale, the combination with the movable platform and the beams included therein, of fixed supports beneath the platform, shoes having slanting soles, secured to said beams, blocks slidably mounted on said supports, said blocks having faces normally disposed beneath the shoes in spaced relation to their soles, and slanting faces of higher elevation capable of engaging the said soles to prevent operative downward movement of the platform, and mechanism for effecting a simultaneous movement of said blocks to a position in which their said higher faces are in engagement with the said soles of the shoes.

3. In a railroad track scale, the combination with the downwardly movable platform, of adjustable means capable of blocking the platform against downward motion, mechanism for the adjustment of said means, an electric lamp and a switch in an electric circuit, and means for opening and closing said switch by action of said mechanism.

4. In a railroad track scale, the combination with the downwardly movable platform, of adjustable means capable of blocking the platform against downward motion, mechanism for the adjustment of said means, a semaphore, an electric-lamp and a switch in an electric circuit, and means for operating the semaphore and opening and closing the switch by action of said mechanism.

5. In a railroad track scale, the combination with the downwardly movable platform and the fifth lever of the scale-mechanism, of adjustable means capable of blocking the platform against downward motion, mechanism for the adjustment of said means, and means for lifting the platform prior to the said adjustment of the blocking means, comprising an operating lever, a bell-crank operatively connected therewith, and a connection between the bell crank and the said fifth lever whereby a movement of the said operating lever is transmitted to the fifth lever.

6. In a railroad track scale, the combination with the movable platform, of blocks adjustably mounted underneath the same, the said blocks having portions which by engagement with faces on the platform, sustain the latter against downward movement, and portions which when the platform is freely suspended for downward movement, are spaced from said faces, to receive the impact of the descending platform in case of excessive movement.

7. In a railroad track scale, the combination with the downwardly movable platform and the fifth lever of the scale mechanism, of adjustable means for blocking the platform against downward motion, mechanism for the adjustment of said means, and lifting means applied to the said fifth lever, separate from its connection with the said scale mechanism, for lifting the platform prior to the said adjustment of the blocking means, by imparting a movement to the fifth lever.

8. In a railroad track scale, the combination with the downwardly movable platform, of adjustable mechanism capable of operation to block the same against downward motion, and means separate from the said mechanism for relieving the same independent of the weight-designating parts of the scale, from the weight of the platform, whereby to facilitate the adjustment of the mechanism to its nonobstructive position.

In testimony whereof I have affixed my signature in presence of two witnesses.

MARTIN MAURER.

Witnesses:
 L. RHOADES,
 F. H. CUNO.